United States Patent
Aimura et al.

(10) Patent No.: US 12,246,638 B2
(45) Date of Patent: Mar. 11, 2025

(54) LIGHT DISTRIBUTION CONTROL DEVICE, LIGHT DISTRIBUTION CONTROL METHOD, AND STORAGE MEDIUM

(71) Applicant: HONDA MOTOR CO., LTD., Tokyo (JP)

(72) Inventors: Makoto Aimura, Tokyo (JP); Takuya Kashiki, Tokyo (JP); Shinya Uno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 311 days.

(21) Appl. No.: 17/678,084

(22) Filed: Feb. 23, 2022

(65) Prior Publication Data
US 2022/0314870 A1 Oct. 6, 2022

(30) Foreign Application Priority Data

Mar. 31, 2021 (JP) .................. 2021-059248

(51) Int. Cl.
*B60Q 1/08* (2006.01)
*B60Q 1/14* (2006.01)
(Continued)

(52) U.S. Cl.
CPC ............ *B60Q 1/085* (2013.01); *B60Q 1/143* (2013.01); *G06V 20/58* (2022.01);
(Continued)

(58) Field of Classification Search
CPC .... B60Q 1/085; B60Q 1/143; B60Q 2300/30; B60Q 2300/40; B60Q 2300/056;
(Continued)

(56) References Cited

U.S. PATENT DOCUMENTS

| | | | |
|---|---|---|---|
| 2010/0156616 A1* | 6/2010 | Aimura | ................... G06T 7/593 340/436 |
| 2013/0229520 A1* | 9/2013 | Aimura | ................ G06V 20/584 348/148 |

(Continued)

FOREIGN PATENT DOCUMENTS

| | | |
|---|---|---|
| CN | 102653256 B | * 11/2014 |
| JP | 2017-202768 | 11/2017 |

(Continued)

OTHER PUBLICATIONS

Japanese Office Action for Japanese Patent Application No. 2021-059248 mailed Jul. 19, 2022.

*Primary Examiner* — Muhammad Shafi
(74) *Attorney, Agent, or Firm* — Amin, Turocy & Watson, LLP

(57) ABSTRACT

A light distribution control device including: an acquirer acquiring information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor; and a light distribution controller performing light distribution control including change of an output level of a headlight of the subject vehicle, in which the light distribution controller gently performs change of the output level of the headlight in accordance with running of the assistance operation in the light distribution control.

10 Claims, 5 Drawing Sheets

(51) Int. Cl.
    *G06V 20/58* (2022.01)
    *G01S 7/41* (2006.01)
    *G01S 13/86* (2006.01)
    *G01S 13/931* (2020.01)
(52) U.S. Cl.
    CPC ...... *B60Q 2300/30* (2013.01); *B60Q 2300/40* (2013.01); *G01S 7/412* (2013.01); *G01S 13/865* (2013.01); *G01S 13/867* (2013.01); *G01S 13/931* (2013.01)
(58) Field of Classification Search
    CPC .. B60Q 2300/45; B60Q 1/249; B60Q 1/1423; G06V 20/58; G06V 10/141; G01S 7/412; G01S 13/865; G01S 13/867; G01S 13/931; G01S 13/34; G01S 17/10; G01S 17/86; G01S 17/931
    USPC .......................................................... 701/49
    See application file for complete search history.

(56) References Cited

U.S. PATENT DOCUMENTS

| | | | | |
|---|---|---|---|---|
| 2013/0343071 A1* | 12/2013 | Nagaoka | ................ | B60Q 1/085 |
| | | | | 362/466 |
| 2014/0003670 A1* | 1/2014 | Aimura | ................. | G06V 20/56 |
| | | | | 382/104 |
| 2017/0332010 A1* | 11/2017 | Asakura | ................. | G05D 1/027 |
| 2020/0010079 A1* | 1/2020 | Ito | ........................ | B60Q 1/1423 |

FOREIGN PATENT DOCUMENTS

| | | |
|---|---|---|
| JP | 2018-024351 | 2/2018 |
| JP | 2018-154313 | 10/2018 |
| WO | 2020/035713 | 2/2020 |

* cited by examiner

LIGHT DISTRIBUTION CONTROL DEVICE, LIGHT DISTRIBUTION CONTROL METHOD, AND STORAGE MEDIUM

CROSS-REFERENCE TO RELATED APPLICATION

Priority is claimed on Japanese Patent Application No. 2021-059248, filed Mar. 31, 2021, the content of which is incorporated herein by reference.

BACKGROUND

Field of the Invention

The present invention relates to a light distribution control device, a light distribution control method, and a storage medium.

Description of Related Art

In the related art, there is a technology for assisting driving such as a collision avoidance operation in accordance with detection of an object in the vicinity of a subject vehicle using an imaging device. In control of such a driving assistance operation, when an emission state of a headlight is changed in accordance with light distribution control, an object that is a target for collision avoidance control is lost in accordance with a change in image luminance, and there is a likelihood of being unable to appropriately perform collision avoidance control. Thus, in automatic high beam control, a technology for inhibiting a change in light distribution of a headlight from a high beam to a low beam at the time of running autonomous emergency braking (AEB) (a collision damage reducing braking system) has been proposed (Japanese Unexamined Patent Application Publication No. 2018-154313).

SUMMARY

However, in light distribution control of the related art, there are cases in which light distribution of a headlight is fixed to a high beam at the time of running the AEB in automatic high beam control, and switching to a low beam is delayed.

The present invention is in view of such situations, and one object thereof is to provide a light distribution control device, a light distribution control method, and a storage medium capable of performing a change of light distribution of a headlight at a more appropriate timing.

A light distribution control device, a light distribution control method, and a storage medium according to the present invention employ the following configurations.

(1): According to one aspect of the present invention, a light distribution control device includes: a storage device storing a program; and a hardware processor, in which the hardware processor, by executing the program stored in the storage device: acquires information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor; performs light distribution control including change of an output level of a headlight of the subject vehicle; and gently performs change of the output level of the headlight in accordance with running of the assistance operation in the light distribution control.

(2): In the aspect (1) described above, light distribution of the headlight is changeable, and in a case in which dimming of the headlight is performed in accordance with running of the assistance operation, the hardware processor predicts a future position of the recognized object and gently performs change of the output level of the headlight for a direction of the predicted position of the object.

(3): In the aspect (1) or (2) described above, the hardware processor returns the light distribution of the headlight to a state before change in a case in which an image feature quantity relating to recognition of the object has been changed with a degree for which the object is not able to be recognized by changing the output level of the headlight.

(4) In any one of the aspects (1) to (3) described above, in a case in which after returning the light distribution of the headlight to the state before change, the image feature quantity relating to the recognition of the object is not recovered up to such a point that the object is recognizable, the hardware processor instructs an object recognition device performing recognition of the object to perform recognition of the object based on a detection result acquired by excluding a detection result acquired by the optical sensor.

(5): According to one aspect of the present invention, there is provided a light distribution control method using a computer, the light distribution control method including: acquiring information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor; performing light distribution control including change of an output level of a headlight of the subject vehicle; and gently performing change of the output level of the headlight in accordance with running of the assistance operation in the light distribution control.

(6): A storage medium according to one aspect of the present invention is a computer-readable non-transitory storage medium having a program stored thereon, the program causing a computer to execute: acquiring information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor; performing light distribution control including change of an output level of a headlight of the subject vehicle; and gently performing change of the output level of the headlight in accordance with running of the assistance operation in the light distribution control.

According to the aspects (1) to (6) described above, information representing a running status of an assistance operation performed for driving assistance is acquired from a driving assistance device performing driving assistance of a subject vehicle based on a recognition result of objects disposed in front of the subject vehicle recognized based on detection results acquired by a plurality of sensors including an optical sensor, and in light distribution control including change of an output level of a headlight of the subject vehicle, change of the output level of the headlight is gently performed in accordance with running of the assistance operation in the light distribution control, whereby degradation of accuracy of recognition of an object can be inhibited in a more appropriate situation.

DESCRIPTION OF EMBODIMENTS

Hereinafter, a light distribution control device, a light distribution control method, and a storage medium according to an embodiment of the present invention will be described with reference to the drawings. As used throughout this disclosure, the singular forms "a," "an," and "the" include plural reference unless the context clearly dictates otherwise.

First Embodiment

[Entire Configuration]

Figure 1:
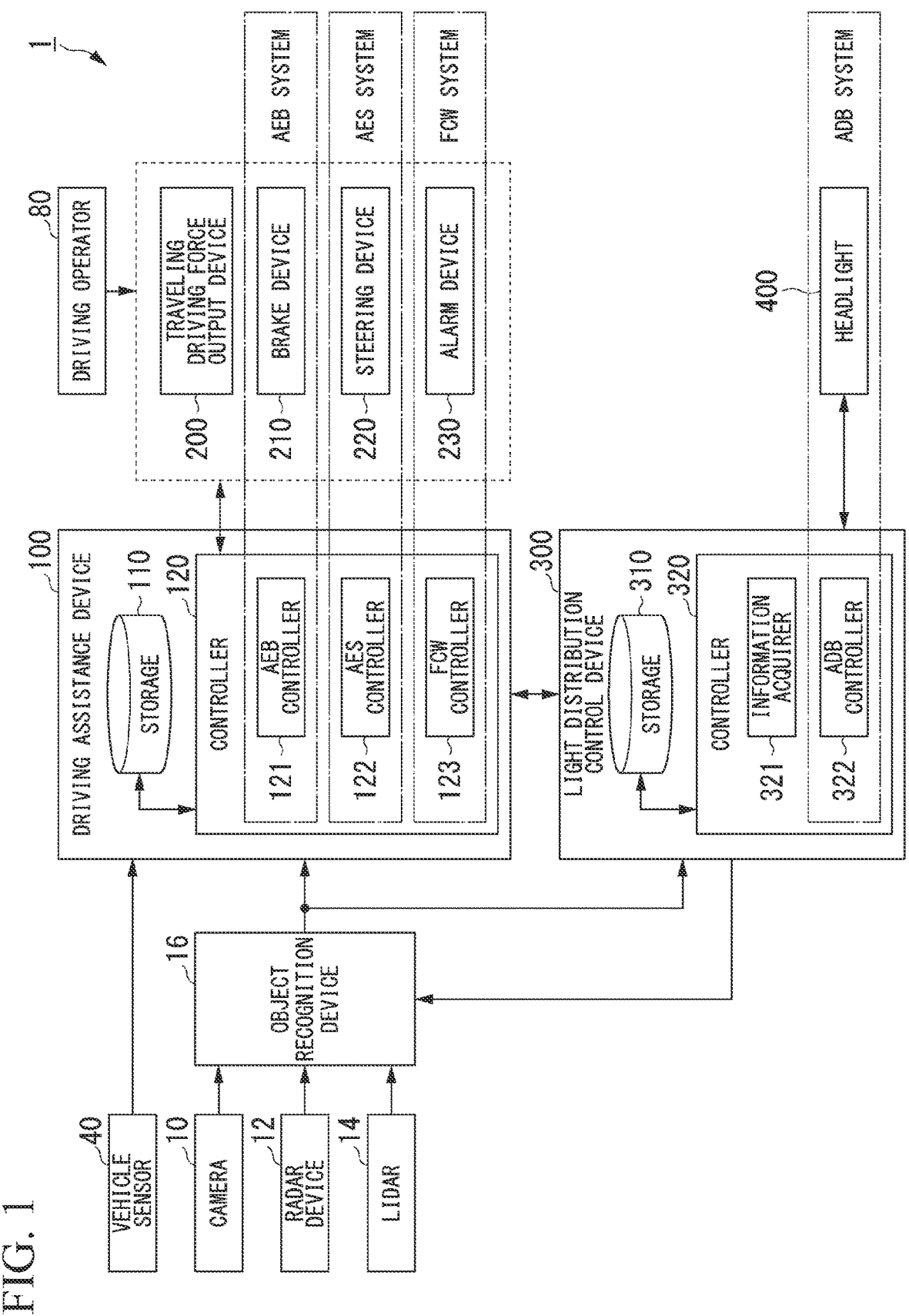
FIG. 1 is a diagram illustrating an example of the configuration of a control system according to an embodiment.

FIG. 1 is a diagram illustrating an example of the configuration of a control system 1 using a driving assistance device 100 according to an embodiment. The control system 1 is mounted in a mobile object. In the following description, the mobile object is assumed to be a vehicle as an example. The vehicle, for example, is a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

For example, the control system 1 includes a camera 10, a radar device 12, a light detection and ranging (LIDAR) 14, an object recognition device 16, a vehicle sensor 40, a driving operator 80, a driving assistance device 100, a traveling driving force output device 200, a brake device 210, a steering device 220, an alarm device 230, a light distribution control device 300, and a headlight 400. Such devices and units are mutually connected using a multiplexing communication line such as a controller area network (CAN) communication line, a serial communication line, a radio communication network, or the like. The configuration illustrated in FIG. 1 is merely an example, and a part of the configuration may be omitted, and an additional configuration may be further added.

The camera 10, for example, is a digital camera using a solid-state imaging device such as a charge coupled device (CCD) or a complementary metal oxide semiconductor (CMOS). The camera 10 is installed at an arbitrary place in a vehicle (hereinafter, a subject vehicle) in which the control system 1 mounted. In a case in which a side in front is to be imaged, the camera 10 is attached to an upper part of a front windshield, a rear face of an interior mirror, or the like. The camera 10, for example, periodically images the vicinity of the subject vehicle repeatedly. The camera 10 may be a stereo camera. The camera 10 is one example of an optical sensor.

The radar device 12 emits radio waves such as millimeter waves to the vicinity of the subject vehicle and detects at least a position of (a distance and an azimuth) an object by detecting radio waves (reflected waves) reflected by the object. The radar device 12 is installed at an arbitrary place on the subject vehicle. The radar device 12 may detect a position and a speed of an object using a frequency modulated continuous wave (FM-CW) system.

The LIDAR 14 emits light (or a radiowave having a wavelength close to light) to the vicinity of the subject vehicle and measures scattered light. The LIDAR 14 detects a distance to a target based on a time from light emission to light reception. For example, the emitted light is pulse-shaped laser light. The LIDAR 14 is attached to an arbitrary place in the subject vehicle.

The object recognition device 16 performs a sensor function process for detection results acquired using some or all of the camera 10, the radar device 12, and the LIDAR 14, thereby recognizing a position, a type, a speed, and the like of an object. More specifically, the object recognition device 16 mainly recognizes a direction of an object and a distance to an object as results of detection acquired by the radar device 12 and the LIDAR 14 and recognizes a kind, a movement, and the like of an object captured in an image by performing image processing on the image captured by the camera 10.

For example, the object recognition device 16 recognizes a specific object using a pattern matching process of recognizing a specific object (for example, an obstacle) by comparing templates prepared in advance with feature quantities acquired from an image or a learned model using machine learning. The learned model is a model that has been learned such that, when an image in which a specific object is captured is input, information indicating presence of a specific object in the image and a position of the specific object is output.

The object recognition device 16 outputs a result of recognition of objects recognized in this way to the driving assistance device 100 and the light distribution control device 300. The object recognition device 16 may directly output detection results acquired by the camera 10, the radar device 12, and the LIDAR 14 to the driving assistance device 100 and the light distribution control device 300. The result of recognition of objects may be supplied to the light distribution control device 300 through the driving assistance device 100. In such a case, the object recognition device 16 may be configured to output the result of recognition of objects only to the driving assistance device 100.

The vehicle sensor 40 includes a vehicle speed sensor that detects a speed of the subject vehicle, an acceleration sensor that detects an acceleration, a yaw rate sensor that detects an angular velocity around a vertical axis, an azimuth sensor that detects the azimuth of the subject vehicle, and the like.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of detection thereof is output to the driving assistance device 100 or some of all of the traveling driving force output device 200, the brake device 210, and the steering device 220.

The traveling driving force output device 200 outputs a traveling driving force (torque) for enabling the vehicle to travel to driving wheels. The traveling driving force output device 200, for example, includes a combination of an internal combustion engine, an electric motor, and a transmission, and an electronic control unit (ECU) controlling these. The ECU controls the components described above in accordance with information input from the controller 120 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the controller 120 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the controller 120.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the controller 120 or information input from the driving operator 80.

[Configuration of Driving Assistance Device]

The driving assistance device 100, for example, includes a storage 110 and a controller 120. The controller 120, for example, is realized by a hardware processor such as a central processing unit (CPU) executing a program (software). Some or all of such constituent elements may be realized by hardware (a circuit; including circuitry) such as a large scale integration (LSI), an application specific integrated circuit (ASIC), a field-programmable gate array (FPGA), a graphics processing unit (GPU), or the like or may be realized by software and hardware in cooperation. The program may be stored in a storage device (a storage device including a non-transitory storage medium) such as an HDD, a flash memory, or the like of the driving assistance device 100 in advance or may be stored in a storage medium such as a DVD or a CD-ROM that can be loaded or unloaded and installed in the HDD or the flash memory of the driving assistance device 100 by loading the storage medium (a non-transitory storage medium) into a drive device.

The storage 110, for example, is realized using an HDD, a flash memory, an electrically erasable programmable read only memory (EEPROM), a read only memory (rom), a random-access memory (RAM), or the like. For example, information including references, thresholds, and the like used by the driving assistance device 100 in control to be described later is stored in the storage 110.

The controller 120, for example, includes an AEB controller 121, an AES controller 122, and an FCW controller 123. The AEB controller 121 controls a driving assistance function of collision damage reducing braking (autonomous emergency braking (AES)). The AEB controller 121 controls the brake device 210 based on a result of recognition of objects in front of the subject vehicle using the object recognition device 16, thereby realizing an AEB function (AEB system).

The AES controller 122 controls a driving assistance function of automatic emergency steering (AES). The AES controller 122 controls the steering device 220 based on a result of recognition of objects in front of the subject vehicle using the object recognition device 16, thereby realizing the AES function (an AES system).

The FCW controller 123 controls a driving assistance function of forward collision warning (FCW). The FCW controller 123 causes the alarm device 230 to perform an alarm operation based on a result of recognition of objects in front of the subject vehicle using the object recognition device 16, thereby realizing an FCW function (an FCW system). The alarm device 230 may be any device as long as it outputs an alarm. For example, the alarm device 230 may be a device that displays an alarm in a display or a device that notifies of an alarm using a voice, a vibration, or the like.

In this embodiment, the AEB system, the AES system, and the FCW system are examples of the driving assistance function for performing an operation of avoiding a risk occurring due to an object present in front of the subject vehicle based on a result of recognition of objects using the object recognition device 16.

[Configuration of Light Distribution Control Device]

The light distribution control device 300, for example, includes a storage 310 and a controller 320. The controller 320, for example, is realized by a hardware processor such as a CPU executing a program (software). Some or all of such constituent elements may be realized by hardware (a circuit; including circuitry) such as an LSI, an ASIC, an FPGA, a GPU, or the like or may be realized by software and hardware in cooperation. The program may be stored in a storage device (a storage device including a non-transitory storage medium) such as an HDD, a flash memory, or the like of the driving assistance device 100 in advance or may be stored in a storage medium such as a DVD or a CD-ROM that can be loaded or unloaded and installed in the HDD or the flash memory of the driving assistance device 100 by loading the storage medium (a non-transitory storage medium) into a drive device.

The storage 310, for example, is realized using an HDD, a flash memory, an EEPROM, a ROM, a RAM, or the like. For example, information including references and thresholds, and the like used by the light distribution control device 300 in control to be described later is stored in the storage 310.

The controller 320, for example, includes an information acquirer 321 and an ADB controller 322. The information acquirer 321 acquires information indicating a running status of an assistance operation in the driving assistance function of each of the AEB system, the AES system, and the FCW system from the driving assistance device 100. The information acquirer 321 acquires information about recognition of objects disposed in front of the subject vehicle (hereinafter referred to as "recognition information) from the object recognition device 16. Information representing an object recognition result and information representing image feature quantities of objects acquired in the process of object recognition are included in the recognition information.

The ADB controller 322 controls light distribution of a headlight 400 of the subject vehicle. The headlight 400 is configured using an adaptive driving beam (ADB) and can change distribution of output light. Hereinafter, in this embodiment, control of "light distribution" represents control of one or both of an output level and an output direction of light. In this embodiment, "dimming" represents adjustment of an output level of light (hereinafter referred to as "dimming level"). More specifically, raising of a dimming level of the headlight 400 corresponds to brightening of lighting of the headlight 400, and lowering of the dimming level corresponds to darkening of lighting of the headlight 400. The ADB controller 322 is one example of a "light distribution controller".

More specifically, at a timing at which it is estimated that there is a possibility of light distribution control of the headlight 400 interfering with an assistance operation according to at least one driving assistance function of driving assistance functions of the AEB system, the AES system, and the FCW system (for example, operations such as a braking operation, a steering operation, an alarm operation, and the like) (hereinafter referred to as an "interference timing") based on recognition information, the ADB controller 322 gently performs change of light distribution. Here, interference of light distribution control for the driving assistance function represents that a way of showing a subject imaged by a camera 10 greatly changes in accordance with change in the light distribution of the headlight 400, and the reliability of a detection result for the vicinity of the subject vehicle that is acquired using the camera 10 is degraded. In other words, in a case in which there is a request for changing light distribution in the case of during running of an assistance operation, the ADB controller 322 gently changes light distribution without having an adverse effect on the assistance operation.

Although the interference timing, typically, may be set to a timing at which an assistance operation is running, in a case in which a running start timing of the assistance operation can be predicted to some degrees, in order to assuredly inhibit an adverse effect of the light distribution control on the assistance operation, a predetermined period before the running start timing (hereinafter, referred to as a "running start standby period") may be included in the interference timing. In other words, since the interference timing is a timing set in accordance with running of the assistance operation, in other words, the ADB controller 322 may be regarded to gently perform change of an output level of the headlight 400 in accordance with running of the assistance operation.

A request for changing light distribution may be appropriately generated based on the state of the subject vehicle, the status of the vicinity of the subject vehicle, and the like by the ADB controller 322 or may be notified to the light distribution control device 300 in accordance with a light distribution changing operation using a driver of the subject vehicle.

In more details, the ADB controller 322 performs the following first to third light distribution changing processes. The first light distribution changing process is a process of gently performing change of the dimming level of the headlight 400 at the interference timing. The second light distribution changing process is a process of predicting movement of an object that is being detected and gently performing change of the dimming level in the direction of the moving object at the interference timing. The third light distribution changing process is a process of instructing the object recognition device 16 to change an operation condition relating to an object recognition process in a case in which reliability of a detection result acquired by the camera 10 has been degraded in accordance with performing of the light distribution control. Hereinafter, details of the first to third light distribution changing processes will be described with reference to flowcharts of FIGS. 2 to 4.

[First Light Distribution Changing Process]

Figure 2:
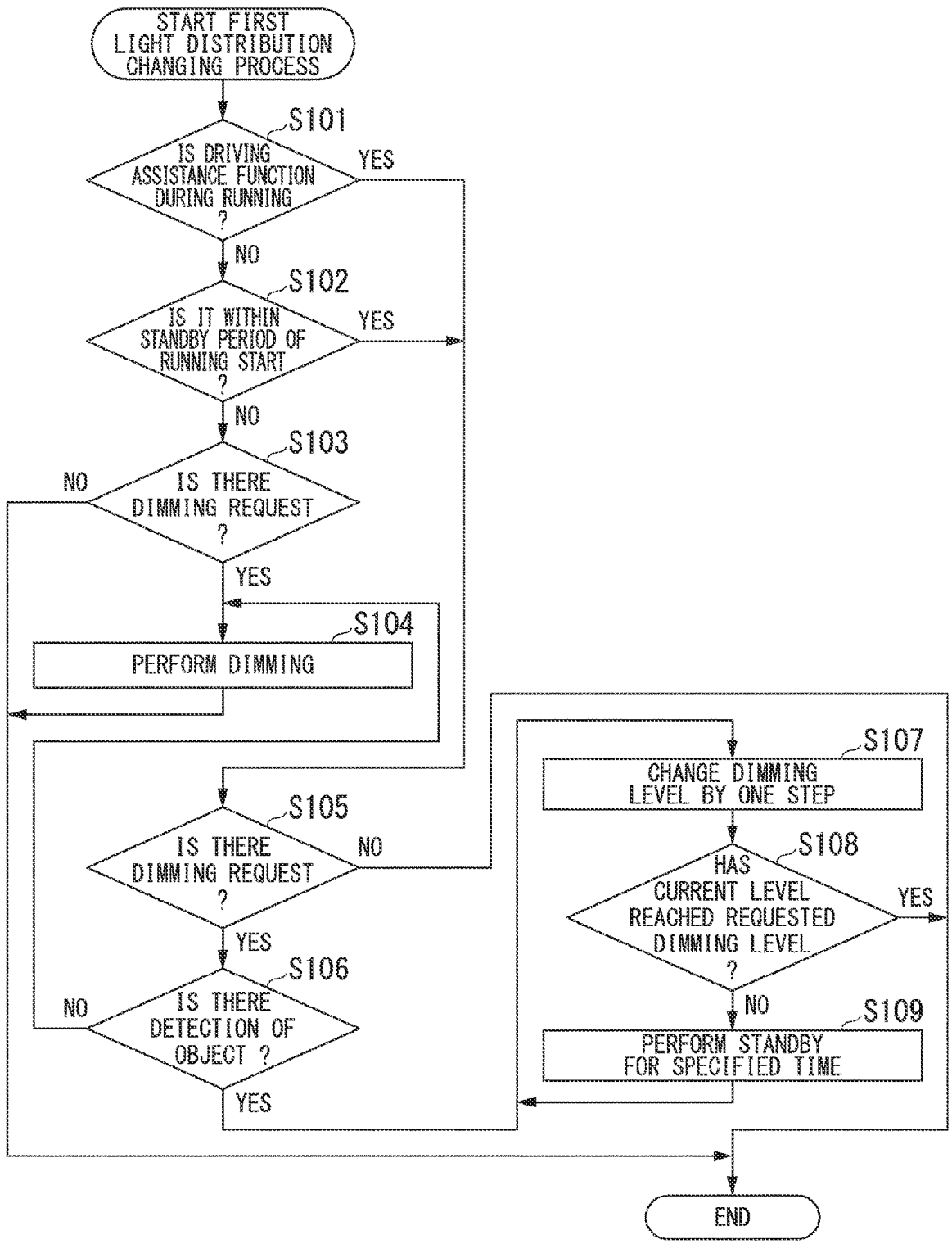
FIG. 2 is a flowchart illustrating an example of the flow of a first light distribution changing process performed by a light distribution control device according to an embodiment.

FIG. 2 is a flowchart illustrating an example of the flow of the first light distribution changing process performed by the light distribution control device 300 according to an embodiment. First, the ADB controller 322 determines whether or not an assistance operation is during running in at least one driving assistance function among driving assistance functions of the AEB system, the AES system, and the FCW system (Step S101).

Here, in a case in which it is determined that no assistance operation is running in all of the AEB system, the AES system, and the FCW system, the ADB controller 322 determines whether or not an assistance operation starts until a specified time elapses in at least one of driving assistance functions of the AEB system, the AES system, and the FCW system (Step S102). In other words, in Step S102, it is determined whether or not the present time is within the running start standby time, and it is determined whether or not the present time is the interference timing in combination with Step S101.

In a case in which determination results in both Steps S101 and S102 are true (Yes), the ADB controller 322 determines that the present time is an interference timing and causes the process to proceed to the process of Step S105. In a case in which determination results in both Steps S101 and S102 are false (No), the ADB controller 322 determines that the present time is not an interference timing and causes the process to proceed to Step S103.

In Step S103, the ADB controller 322 determines whether or not there is a dimming request. Here, in a case in which it is determined that there is a dimming request, the ADB controller 322 performs dimming control for a requested dimming level (Step S104) and ends the first light distribution changing process. On the other hand, in a case in which it is determined that there is no dimming request in Step S103, the ADB controller 322 skips Step S104 and ends the first light distribution changing process. In Step S105, the ADB controller 322 determines whether or not there is a dimming request (Step S105). Here, in a case in which it is determined that there is no dimming request, the ADB controller 322 ends the first light distribution changing process. On the other hand, in a case in which it is determined that there is a dimming request in Step S105, the ADB controller 322 determines whether or not an object has been detected by the object recognition device 16 (Step S106). Here, in a case in which it is determined that an object has not been detected by the object recognition device 16, the ADB controller 322 causes the process to proceed to Step S104, performs the requested dimming, and ends the light distribution changing process.

On the other hand, in a case in which it is determined that an object has been detected by the object recognition device 16 in Step S106, the ADB controller 322 changes the dimming level of the headlight 400 by one step toward the requested dimming level (Step S107). Here, the dimming level represents an output level of light corresponding to each step when the requested dimming is realized in a plurality of steps.

When the dimming level is changed by one step in Step S107, next, the ADB controller 322 determines whether or not the dimming level after change has reached the requested dimming level (Step S108). Here, in a case in which it is determined that the dimming level after change has reached the requested dimming level, the ADB controller 322 ends the light distribution changing process. On the other hand, in a case in which it is determined that the dimming level after change has not reached the requested dimming level in Step S108, the ADB controller 322 performs standby for a specified time (Step S109), then returns the process to the process of Step S106, and repeatedly performs stepwise change of the dimming level until the dimming level after change reaches the requested dimming level.

By executing such a first light distribution changing process, the ADB controller 322 gently performs change of the output level of light at a timing at which light distribution control of the headlight 400 performed thereby interferes with the driving assistance functions of the AEB system, the AES system, and the FCW system (an interference timing), thereby being able to inhibit degradation of accuracy of object recognition according to a change of light distribution of the headlight 400.

[Second Light Distribution Changing Process]

Figure 3:
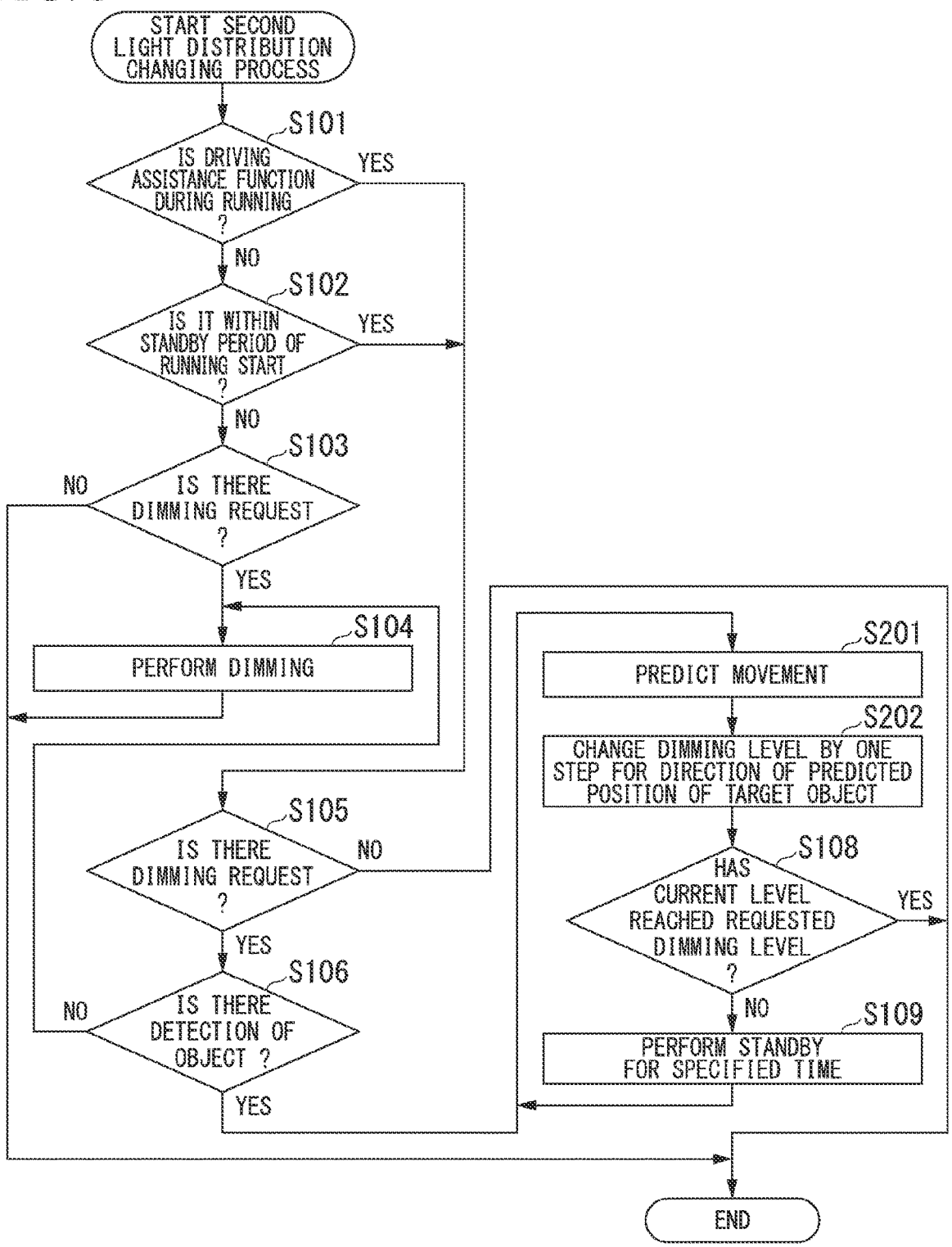
FIG. 3 is a flowchart illustrating an example of the flow of a second light distribution changing process performed by the light distribution control device according to the embodiment.

FIG. 3 is a flowchart illustrating an example of the flow of the second light distribution changing process performed by the light distribution control device 300 according to the embodiment. In FIG. 3, the same reference numerals as those of FIG. 2 will be assigned to processes similar to those of the first light distribution changing process, and thus description thereof will be omitted. In the second light distribution changing process, the ADB controller 322 performs Step S201 and S202 in place of Step S107, which is different from the first light distribution changing process.

More specifically, in a case in which it is determined that an object is being detected by the object recognition device 16 in Step S106, the ADB controller 322, first, predicts movement of the detected object (hereinafter referred to as a "target object") (Step S201) and changes the dimming level by one step in the direction of a predicted position of the moving target object (Step S202). For example, the ADB controller 322 may predict a movement direction and a movement speed of the target object based on past recognition results of target objects acquired by the object recognition device 16 and predict a place at which the object will be arrived in accordance with movement at the predicted movement speed in the predicted movement direction for a predetermined time as a movement destination place of the target object.

Figure 4:
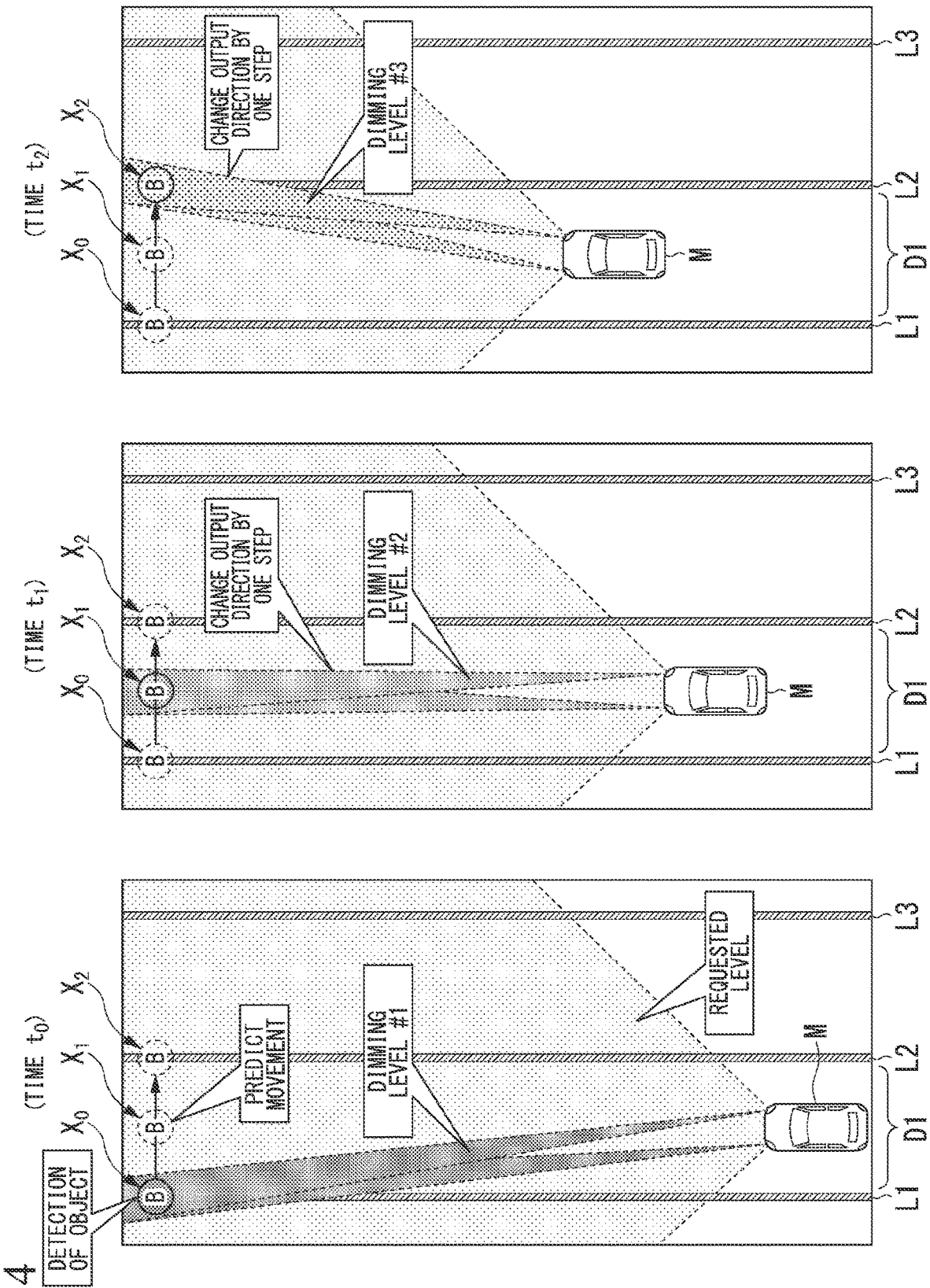
FIG. 4 is a diagram illustrating an example of a situation in which a change of light distribution in an object direction is gently performed in accordance with movement of an object in the second light distribution changing process.

FIG. 4 is a diagram illustrating an example of a situation in which a change of a dimming level is gently performed in light distribution in a target object direction in the second light distribution changing process. FIG. 4 illustrates a situation in which a subject vehicle M is traveling in a lane D1 represented using road partition lines L1 to L3. In such a situation, for example, it is assumed that a target object B is detected at a point $X_0$ at a time $t_0$, and there is a dimming request for raising a dimming level at this timing. Then, at this time, it is assumed that the ADB controller 322 predicts such a movement of the target object B that it arrives at a point $X_1$ at a time $t_1$ (>the time $t_0$) and arrives at a point $X_2$ at a time $t_2$ (>the time $t_1$). In this case, the ADB controller 322 gently raises the dimming level for the direction of the position of the target object B while following the movement of the target object B.

For example, at the time $t_0$, after generation of a dimming request, the ADB controller 322 quickly changes a current dimming level to a requested dimming level (requested level) for a direction in which a target object B is not present and changes a current dimming level to a dimming level #1, which is a dimming level acquired by raising the current dimming level by one step toward the requested level, for a direction in which a target object B is present (at this time point, the direction of the point $X_0$ when seen from the subject vehicle M).

Subsequently, at a time $t_1$ that is a time when a predetermined time elapses from the time $t_0$, the ADB controller 322 maintains the requested level for a direction in which a target object B is not present and changes the dimming level #1 that is the current dimming level to a dimming level #2, which is a dimming level acquired by further raising the current dimming level by one step toward the requested level, for a direction in which a target object B is present (at this time point, the direction of the point $X_1$ when seen from the subject vehicle M).

Subsequently, at a time $t_2$ that is a time when a predetermined time elapses from the time $t_1$, the ADB controller 322 maintains the requested level for a direction in which a target object B is not present and changes the dimming level #2 that is the current dimming level to a dimming level #3, which is a dimming level acquired by further raising the current dimming level by one step toward the requested level, for a direction in which a target object B is present (at this time point, the direction of the point $X_2$ when seen from the subject vehicle M).

By performing such a second light distribution changing process, in a case in which there is dimming request for the headlight 400 at a timing at which light distribution control of the headlight 400 interferes with a driving assistance function of any one of the AEB system, the AES system, and the FCW system (an interference timing), the ADB controller 322 can gently perform change of the dimming level for the direction of the position of the target object and can cause an emission range of light of which change of the dimming level is gently performed to be directed in a direction of the target object by following the movement of the target object. As a result, it is inhibited to greatly change a way in which the target object is shown in accordance with change of the dimming level of the headlight 400. In other words, according to the light distribution control device 300 of the embodiment, interference between light distribution control of the headlight 400 and the driving assistance function is inhibited, and degradation of the driving assistance function can be inhibited.

[Third Light Distribution Changing Process]

Figure 5:
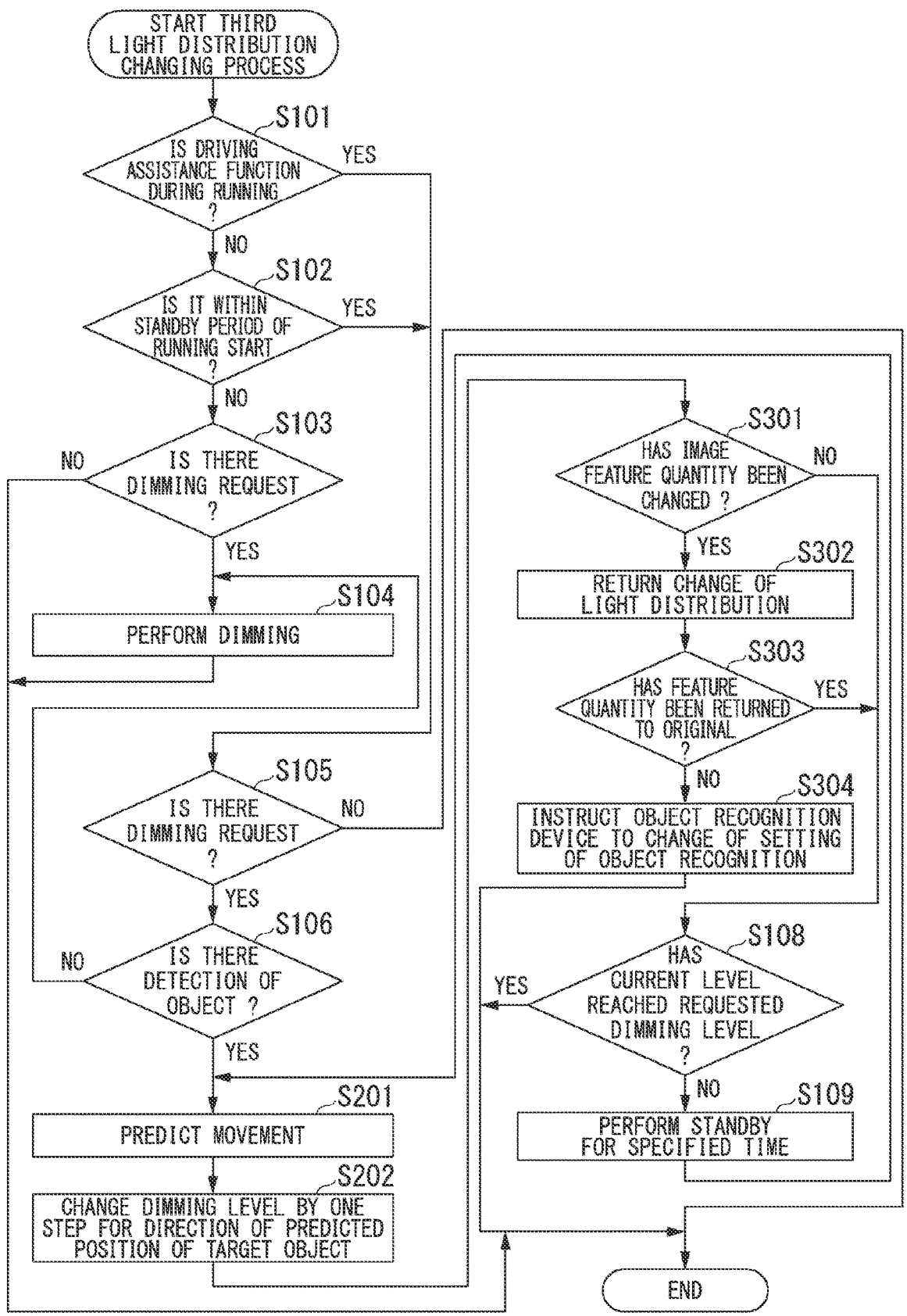
FIG. 5 is a flowchart illustrating an example of the flow of a third light distribution changing process performed by a light distribution control device according to an embodiment.

FIG. 5 is a flowchart illustrating an example of the flow of the third light distribution changing process performed by the light distribution control device 300 according to the embodiment. In FIG. 5, the same reference numerals as those of FIG. 3 will be assigned to processes similar to those of the second light distribution changing process, and thus description thereof will be omitted. In the third light distribution changing process, the ADB controller 322 further performs processes of Steps S301 to S304, which is different from the second light distribution changing process.

More specifically, when the dimming level is changed by one step for the direction of the predicted position of the target object in Step S202, the ADB controller 322 determines whether or not there is a change in an image feature quantity at the time of recognizing the target object in accordance with performance of change of the dimming level (Step S301). In this determination, error in the feature quantity within a range in which the same target object can be recognized between frames to be compared with each other may be ignored. In other words, in this case, such error may be allowed as "no change". In a case in which it is determined that the image feature quantity has not been changed for the target object, the ADB controller 322 causes the process to proceed to Step S108 and performs stepwise change of the light distribution (a dimming level and an output direction of light) until the current dimming level reaches the requested dimming level.

On the other hand, in a case in which it is determined that the image feature quantity of the target object has been changed in Step S301, the ADB controller 322 returns the light distribution changed in Step S202 to the state before change (Step S302). The ADB controller 322 determines whether or not the image feature quantity of the target object has returned to an image feature quantity before the change of the dimming level in Step S202 (hereinafter referred to as an "image feature quantity before change") by returning the change of the light distribution to the original of the light distribution in Step S302 (Step S303). In other words, the ADB controller 322 determines whether or not the image feature quantity has been recovered until the target object can be recognized.

Here, in a case in which it is determined in Step S303 that the image feature quantity of the target object has returned to the image feature quantity before change, the ADB controller 322 causes the process to proceed to Step S108 and performs stepwise change of the light distribution until the current dimming level reaches the requested dimming level. On the other hand, in a case in which it is determined that the image feature quantity of the target object has not returned to the image feature quantity before change, the ADB controller 322 instructs the object recognition device 16 to change a setting relating to object recognition (Step S304). More specifically, the ADB controller 322 instructs the object recognition device 16 to perform object recognition without using a detection result acquired by the camera 10 in sensor fusion.

By performing such a third light distribution changing process, in a case in which the image feature quantity of a target object changes such that recognition of the target object cannot be continued as a result of change of the light distribution for the direction of the predicted position of the target object, the ADB controller 322 can return the light distribution for the direction of the target object to the state before change. In accordance with this, the ADB controller 322 can gently perform change of a dimming level for the direction of a target object while inhibiting a case in which recognition of the target object cannot be continued in accordance with change of the light distribution.

In a case in which the image feature quantity of an object is not returned to the feature quantity before change even when the light distribution for the direction of the target object is returned to the state before change, in other words, in a case in which the reliability of a detection result acquired by the camera 10 is degraded to exceed an allowed range, the ADB controller 322 instructs the object recognition device 16 to perform object recognition without using the detection result acquired by the camera 10 in sensor fusion. In accordance with this, the ADB controller 322 can inhibit degradation of recognition accuracy of a target object according to a change of the dimming level for the direction of the target object.

In Step S304, the ADB controller 322 may be configured to decrease an influence of the detection result acquired by the camera 10 on the recognition result by performing weighting according to a degree of reliability on the detection result acquired by the camera 10 or the like instead of not completely using the detection result acquired by the camera 10 in sensor fusion.

The light distribution control device 300 configured in this way gently performs change of the output level of light for a specific direction at a timing at which there is a high possibility of light distribution control of the headlight 400 interfering with control of the driving assistance functions of the AEB controller 121, the AES controller 122, and the FCW controller 123 (an interference timing), thereby localizing change of the light distribution of the headlight 400 and being able to inhibit the influence on an image recognition result with a higher level.

As above, although forms for performing the present invention have been described using the embodiment, the present invention is not limited to such an embodiment at all, and various modifications and substitutions can be applied within a range not departing from the concept of the present invention.

What is claimed is:

1. A light distribution control device, comprising:
a storage device storing a program; and
a hardware processor,
wherein the hardware processor, by executing the program stored in the storage device:
acquires information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor;
performs light distribution control including change of an output level of a headlight of the subject vehicle; and
performs change of the output level of the headlight, in the light distribution control, the change is performed such that there is not an adverse effect on the assistance operation in accordance with running of the assistance operation,
wherein the hardware processor returns the light distribution of the headlight to a state before change in a case in which an image feature quantity relating to recognition of the object has been changed with a degree for which the object is not able to be recognized by changing the output level of the headlight.

2. A light distribution control device, comprising:
a storage device storing a program; and
a hardware processor,
wherein the hardware processor, by executing the program stored in the storage device:
acquires information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor;
performs light distribution control including change of an output level of a headlight of the subject vehicle; and
performs change of the output level of the headlight, in the light distribution control, the change is performed such that there is not an adverse effect on the assistance operation in accordance with running of the assistance operation,
wherein, in a case in which after returning the light distribution of the headlight to a state before change, an image feature quantity relating to the recognition of the object is not recovered up to such a point that the object is recognizable, the hardware processor instructs an object recognition device performing recognition of the object to perform recognition of the object based on a detection result acquired by excluding a detection result acquired by the optical sensor.

3. A light distribution control method using a computer, the light distribution control method comprising:
acquiring information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor;
performing light distribution control including change of an output level of a headlight of the subject vehicle;
performs change of the output level of the headlight, in the light distribution control, the change is performed such that there is not an adverse effect on the assistance operation in accordance with running of the assistance operation; and
returning the light distribution of the headlight to a state before change in a case in which an image feature quantity relating to recognition of the object has been changed with a degree for which the object is not able to be recognized by changing the output level of the headlight.

4. A computer-readable non-transitory storage medium having a program stored thereon, the program causing a computer to execute:
acquiring information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor;
performing light distribution control including change of an output level of a headlight of the subject vehicle;
performs change of the output level of the headlight, in the light distribution control, the change is performed such that there is not an adverse effect on the assistance operation in accordance with running of the assistance operation; and
returning the light distribution of the headlight to a state before change in a case in which an image feature quantity relating to recognition of the object has been changed with a degree for which the object is not able to be recognized by changing the output level of the headlight.

5. The light distribution control device according to claim 1, wherein
wherein the hardware processor changes the output level of the headlight by one step toward the requested dimming level, and the output level being an output level of light corresponding to each step when the requested output is realized in a plurality of steps.

6. A light distribution control method using a computer, the light distribution control method comprising:
acquiring information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor;
performing light distribution control including change of an output level of a headlight of the subject vehicle; and
performs change of the output level of the headlight, in the light distribution control, the change is performed such that there is not an adverse effect on the assistance operation in accordance with running of the assistance operation,
wherein, in a case in which after returning the light distribution of the headlight to a state before change, an image feature quantity relating to the recognition of the object is not recovered up to such a point that the object is recognizable, the method further comprises instructing an object recognition device performing recognition of the object to perform recognition of the object based on a detection result acquired by excluding a detection result acquired by the optical sensor.

7. A computer-readable non-transitory storage medium having a program stored thereon, the program causing a computer to execute:
acquiring information representing a running status of an assistance operation performed for driving assistance from a driving assistance device performing driving assistance of a subject vehicle based on a recognition result of objects disposed in front of the subject vehicle recognized based on detection results acquired by a plurality of sensors including an optical sensor;
performing light distribution control including change of an output level of a headlight of the subject vehicle; and
performs change of the output level of the headlight, in the light distribution control, the change is performed such that there is not an adverse effect on the assistance operation in accordance with running of the assistance operation,
wherein, in a case in which after returning the light distribution of the headlight to a state before change, an image feature quantity relating to the recognition of the object is not recovered up to such a point that the object is recognizable, the method further comprises instructing an object recognition device performing recognition of the object to perform recognition of the object based on a detection result acquired by excluding a detection result acquired by the optical sensor.

8. The light distribution control device according to claim 2,
wherein the hardware processor changes the output level of the headlight by one step toward the requested dimming level, and the output level being an output level of light corresponding to each step when the requested output is realized in a plurality of steps.

9. The light distribution control device according to claim 2,
wherein light distribution of the headlight is changeable, and
wherein, in a case in which dimming of the headlight is performed in accordance with running of the assistance operation, the hardware processor predicts a future position of the recognized object and performs change of the output level of the headlight for a direction of the predicted position of the object.

10. The light distribution control device according to claim 1,
wherein light distribution of the headlight is changeable, and wherein, in a case in which dimming of the headlight is performed in accordance with running of the assistance operation, the hardware processor predicts a future position of the recognized object and performs change of the output level of the headlight for a direction of the predicted position of the object.

\* \* \* \* \*